June 25, 1968 R. S. WEBB 3,390,244
MACHINING APPARATUS OF THE ELECTROEROSIVE TYPE
Original Filed Feb. 24, 1961 3 Sheets-Sheet 1
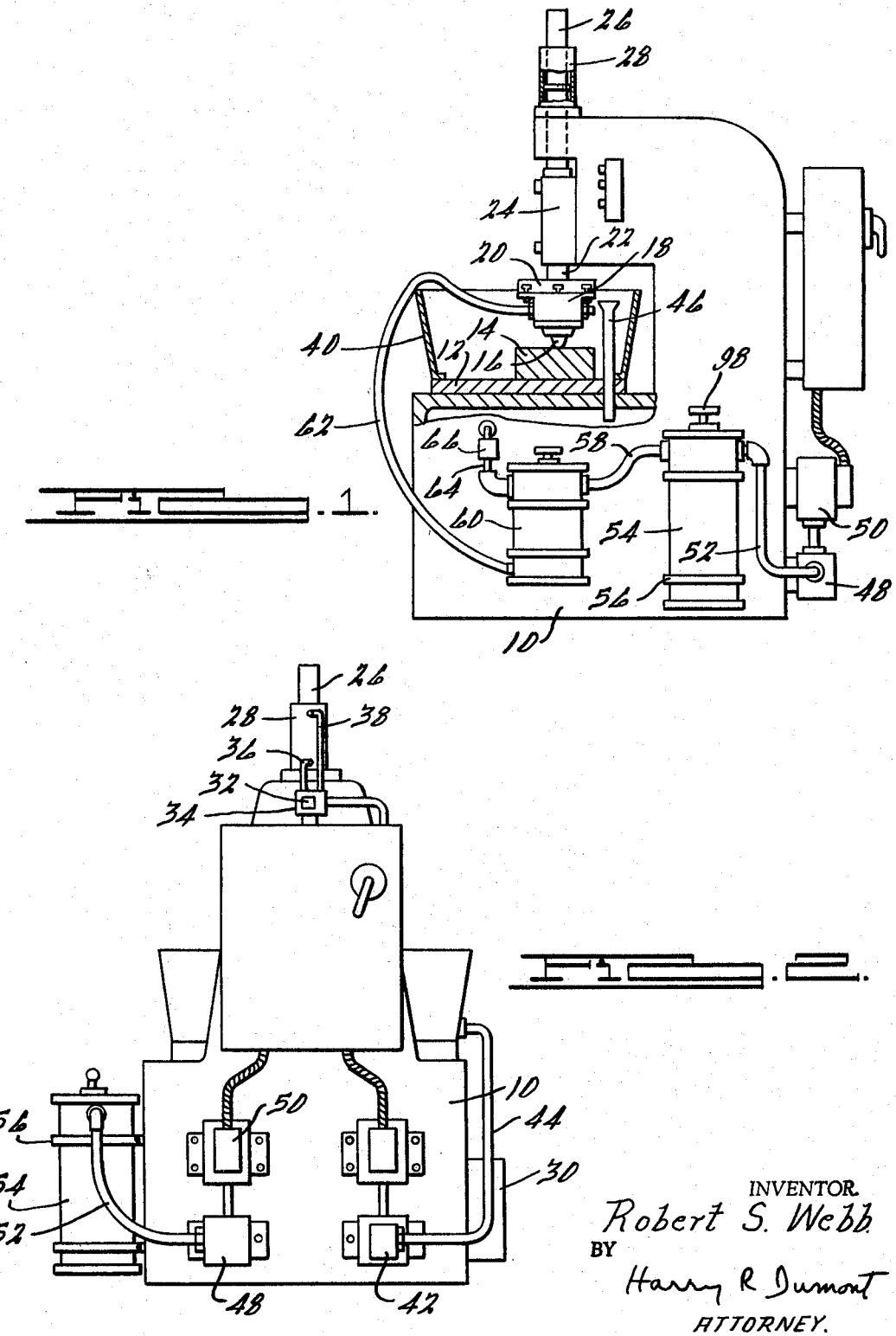

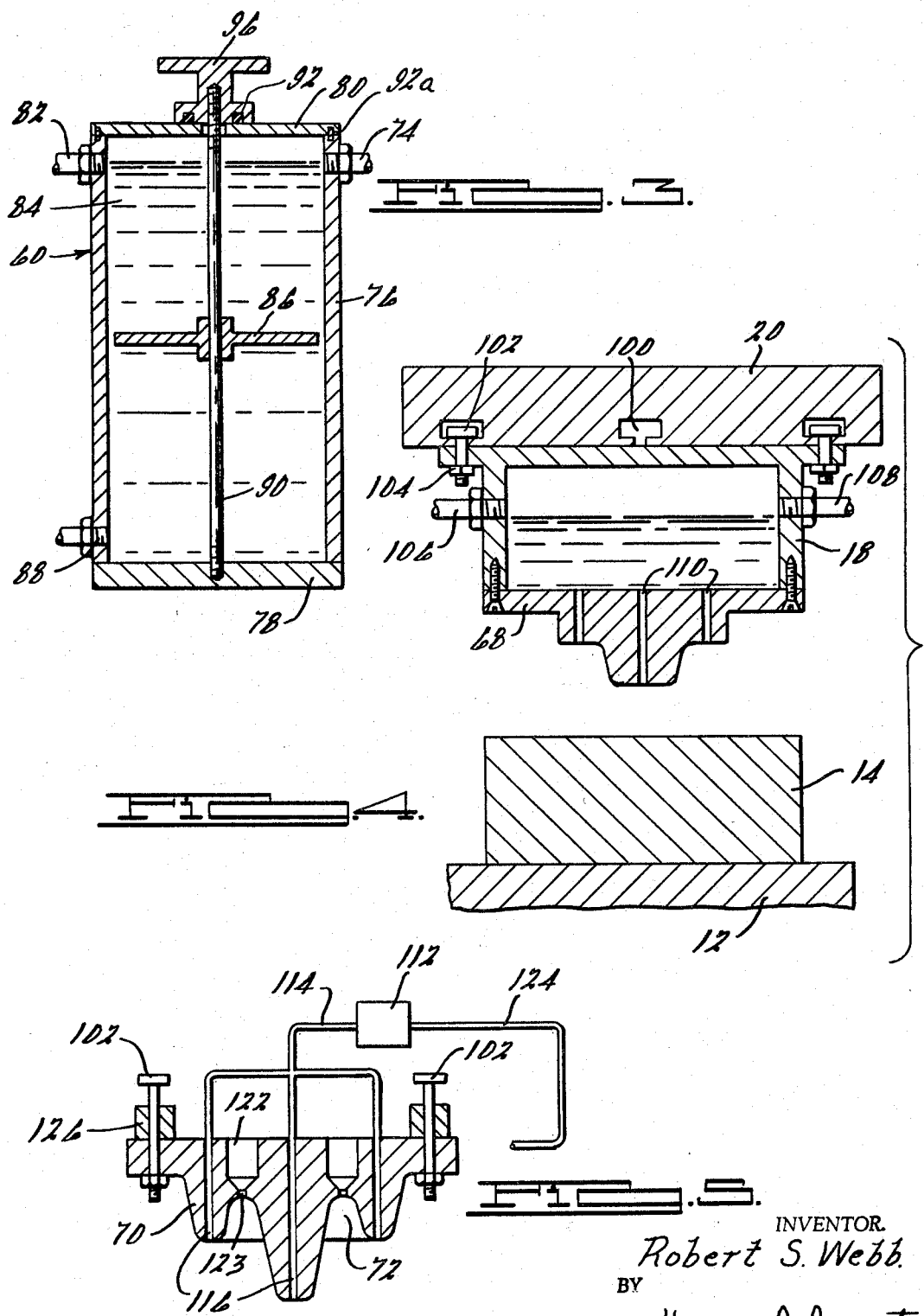

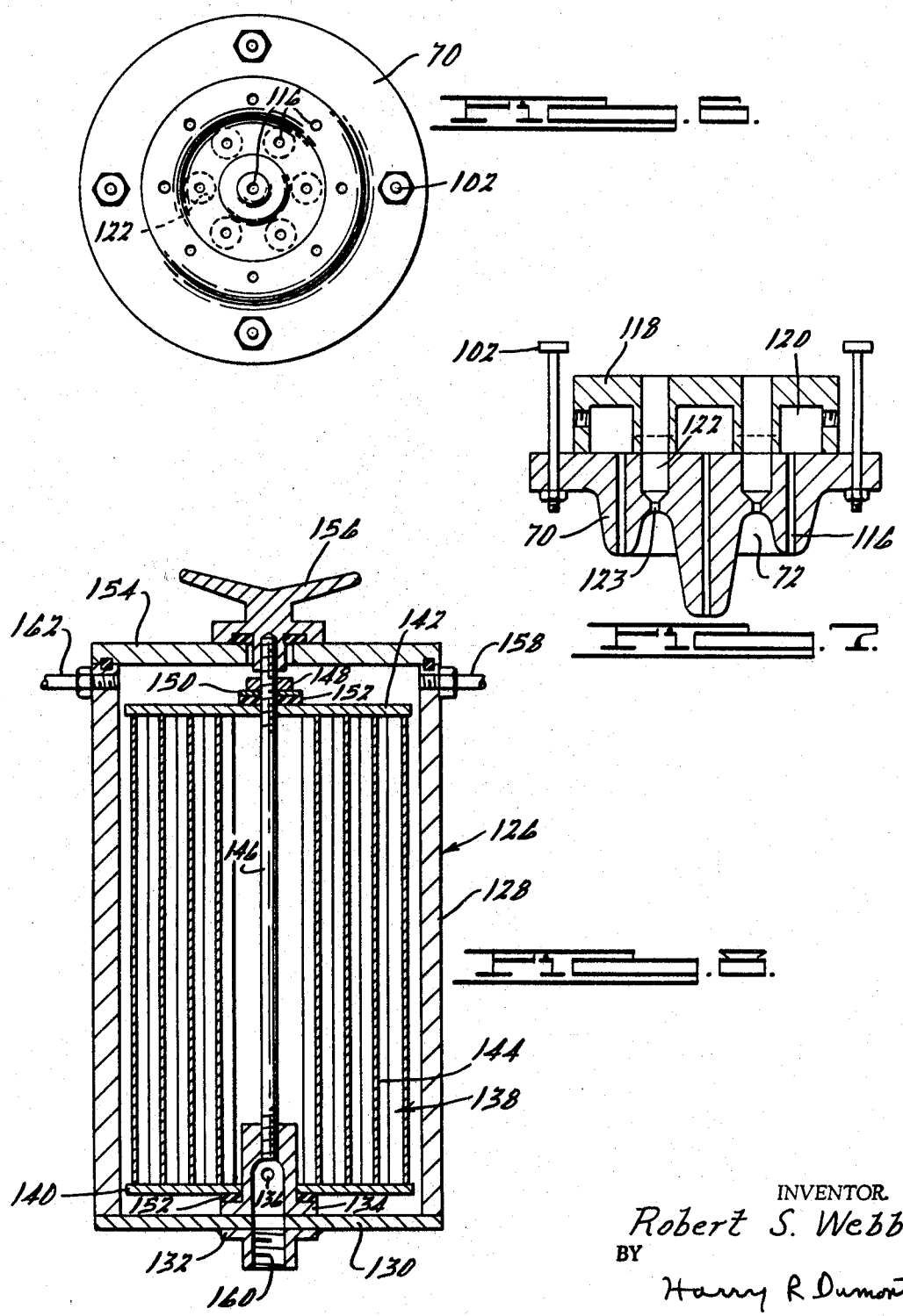

United States Patent Office 3,390,244
Patented June 25, 1968

3,390,244
MACHINING APPARATUS OF THE
ELECTROEROSIVE TYPE
Robert S. Webb, Bloomfield Hills, Mich., assignor, by mesne assignments, to Elox Inc., Troy, Mich., a corporation of Delaware
Continuation of application Ser. No. 91,457, Feb. 24, 1961. This application July 6, 1965, Ser. No. 469,578
11 Claims. (Cl. 219—69)

ABSTRACT OF THE DISCLOSURE

A coolant circulating and electrode system for electrical machining in which a fluid coolant is continuously circulated through a machining spark gap. The electrode has protuberant portions and adjacent reentrant portions, which portions have fluid passages opening through their machining faces. Gap-cooling and flushing fluid may selectively be forced or sucked through either the protuberant or the reentrant passages.

---

This application is a continuation of my copending application Ser. No. 91,457, filed Feb. 24, 1961, entitled "Coolant Gas Dome," now abandoned.

Electrical discharge machining, commonly referred to in the art as 'EDM" or "spark machining," is one type of electrical machining carried on by passing a series of relatively low voltage, high current, high frequency, localized discharges across a gap between an electrode and a conductive workpiece in the presence of a dielectric fluid.

Electrochemical machining, sometimes referred to as "ECM" or "electrolytic machining," is another type of electrical machining carried on by passing a substantially constant unidirectional current of relatively uniform area density across a gap between an electrode and a conductive workpiece through an electrolyte.

In both machining processes, the conductive electrode is maintained in proximate position with the workpiece by an automatic servo feed and is advanced toward or into the workpiece as stock is removed therefrom. A fluid coolant is circulated or flushed through the working gap, usually furnished under pressure by a pump and circulated through a pattern of holes in the electrode. In electrical discharge machining, this coolant is by definition, "a dielectric" and is nearly always a liquid, such as kerosene or transformer oil. In electrochemical machining, an electrolyte or electrically conductive liquid is used in which an ionizable salt such as sodium chloride is dissolved in a liquid such as water.

An example of an electrical discharge power circuit is shown in my copending application Ser. No. 747,078, filed July 7, 1958. An example of an electrochemical machining power circuit is shown in my copending application Ser. No. 811,422, filed May 6, 1959. An example of an automatic servo feed control for either type of machining power circuit is shown in my Patent No. 2,962,630. That patent shows the control circuitry and means for operating the hydraulic servo system shown in FIGS. 1 and 2 of the attached drawings.

In both electrical discharge machining and electrochemical machining, I have found that a problem exists in the normal liquid circulating system for each of these machining processes. In both processes, the liquid when compressed by the circulating pump tends to decompose and form gas or tends to entrap air from the intake or fittings of the circulating system. Furthermore, both machining processes tend to cause decomposition of the liquid in the machining gap and some of the products of decomposition are gases. In the case of electrical discharge machining, this occurs because the minute localized discharges occurring at extremely high temperatures cause decomposition of a portion of the dielectric fluid and certain portions of the electrode and workpiece as well. In electrochemical machining, in which current flows with a substantially uniform current density over the entire face of the electrode in proximity to the workpiece, gas is generated at the cathode during the electrolytic action because of the hydrogen liberated from the water as it decomposes by the processes well known in the electroplating and electrolytic machining art.

In any case, this developed gas produces extremely undesirable results as it is trapped in or flows through the working gap. Extremely irregular machining results frequently causing short circuiting and burning of the electrode and workpiece and, in any case, completely stopping the metal removal process until the entrapped gas has been cleared from the gap.

Accordingly, it is the principal object of this invention to eliminate this entrapped gas from the circulating system and particularly to prevent gas developed in the circulating system itself from reaching the working gap.

Another object of this invention is to provide a novel electrode construction or a specialized method of machining and for eliminating the gas from the machining gap itself.

A further object is to provide a novel electrode manifold and circulating system for eliminating this undesirable gas from the working gap.

Still another object is to provide a circulating system for an entirely new method of electrical discharge machining.

Other objects and advantages will become apparent from the following specification which taken in conjunction with the accompanying drawings discloses preferred forms of practicing the invention.

In the drawings, in which reference characters have been used to designate like parts herein referred to:

FIG. 1 is a side view shown partially in section of an electrical machining tool with my improved fluid circulating system;

FIG. 2 is a rear view of this machine tool showing the fluid circulating pumps and fluid conduit arrangement for practicing one form of my invention;

FIG. 3 is a section on an enlarged scale showing the details of a gas dome that may be used, particularly in electrochemical machining where large quantities of gas are evolved;

FIG. 4 is a sectional view of the workpiece and electrode and special manifold (shown in FIG. 1) for gas elimination directly at the electrode;

FIG. 5 is a sectional view of another type of electrode and a fluid circulating system therefor which may be operated in two different methods;

FIG. 6 is a bottom view of the FIG. 5 electrode showing the detail of the coolant hole pattern;

FIG. 7 is a sectional view of a similar electrode with a modified fluid handling system; and FIG. 8 is a sectional view of a modified filter.

Referring now to FIG. 1, it may be seen that the machine tool has a support structure 10 which includes a hollow base for containing the coolant fluid when not in use, a vertical column and overarm support for propertly holding and positioning the electrode above the workpiece. The machine tool includes a bed or table 12 which is adapted to support a workpiece 14. A machining electrode 16 is mounted on a manifold 18 which, in turn, is fastened to ram platen 20. A movable ram 22 is driven vertically in slide 24 by piston rod 26. A hydraulic cylinder 28, for controlling the motion of piston rod 26, is secured to the overarm of machine frame 10. Hydraulic fluid is selectively supplied under pressure to either the top or bottom of cylinder 28 and exhausted from the opposite end thereby, driving piston rod 26 either down or up, respectively.

A hydraulic power pack 30 (FIG. 2) furnishes hydraulic fluid under pressure to servo valve 32, which provides through manifold 34, hydraulic pressure to either line 36 or 38 connected respectively to the bottom and the top of cylinder 28. By means described in Patent No. 2,962,630, mentioned above, this hydraulic servo system automatically maintains the electrode in proximate position with the workpiece and advances the electrode into the workpiece as machining progresses.

Means is provided for rapidly filling a workpan 40 preparatory to machining and for rapidly emptying the pan after the machining operation, which includes fast fill motor driven pump 42 connected to workpan 40 by flexible line 44. An integral check valve is employed in or near pump 42 for preventing liquid from draining from the pan back to the base. This valve may be opened automatically and pump 42 reversed to drain the pan, or standpipe 46 may be removed.

In both EDM and ECM, the workpiece is submerged in the coolant liquid, confined by workpan 40. The level of this liquid above the workpiece is maintained by standpipe 46. A circulating pump 48 driven by motor 50 draws liquid from the reservoir in the base of machine 10 for coolant circulation during machining. This liquid is forced under pressure through line 52, into filter 54 for clarifying the liquid and removing the particles or sludge which result from the machining operation. Filter 54 is secured to the machine base by clamps 56. The filtered output of filter 54 is delivered through hose 58 to a gas dome 60. This gas dome is also secured to the machine base by clamps. When a gas-eliminating manifold, as shown in FIG. 4, or the system shown in FIG. 5, is employed, this gas dome is sometimes unnecessary. In electrochemical machining, however, relatively great volumes of gas are generated by electrochemical action within the electrolyte and the gas dome is frequently necessary for good machining as will be hereinafter explained. Gas free liquid is provided to manifold 18 through flexible hose 62. A bypass line 64 and bypass control valve 66 are provided as shown for bypassing the unused portion of the liquid and the unwanted gas as shown in detail in FIG. 3.

There are two basic shapes or types of electrode used in electrical machining. They are shown respectively as 68 in FIG. 4 and 70 in FIG. 5. The type of electrode shown as 68 may be thought of as "convex" and is characterized in the machining position by having no pockets or areas in which gas may be entrapped in the machining zone. Electrode 70 may be called "concave" in which pockets such as 72 would form gas traps in a liquid dielectric with the electrode mounted in this position. All electrodes, regardless of complexity, may be defined as one or the other of these two type. In the position shown with the forward or projecting portion of electrode 70 downward, gas will tend to rise into pockets 72 and, if it were not removed by some means, would remain trapped there during the entire machining operation or rather until it interrupted the machining operation because of the undesirable entrapped gas.

Electrode 68 is quite different, in that there are no concave portions or gas traps and any gas generated within the working gap tends to rise normally along the outer face of the electrode until it bubbles harmlessly out of the gap area. The circulating system for each of these two different types of electrodes and particularly the manifold construction for each is quite different.

It is well known that all gases are many times lighter in weight than liquid and will always rise to the top of a container or the uppermost portion of a confined area. Any gas trapped in this manner in pockets 72 of concave electrode 70 is thus trapped and prevented from escaping from the work gap unless suitable means is provided.

Referring now to FIG. 3, it may be seen that a liquid inlet port 74 is provided in the top of gas dome 54. Cylinder body 76, bottom 78 and cover 80 confine the fluids under pressure as generated by the circulating pump. Any gas carried in the fluid through inlet 74 into gas dome 60 will tend to rise to the top of the gas dome. A bypass outlet port 82 is provided for connection to bypass line 64 and valve 66 as shown in FIG. 1 for bypassing a portion of the fluid. Circulating systems generally are provided with a flow rating in excess of the largest job required, and a portion of this flow is bypassed to achieve the desired flow rate and pressure. Through use of gas dome 60, any entrapped or generated gas in the fluid circulation system is bypassed first under considerable velocity through valve 66, since the gas has extremely low viscosity and high mobility through valve 66 in comparison to any liquid that may be employed. In this manner, gas dome 54 is always substantially filled with liquid 84 and nearly always some amount of excess liquid is discharging through bypass outlet 82. A baffle plate 86 is provided to prevent gas from being carried downward by the normal turbulence of the liquid. A pressure outlet port 88 is provided in the bottom of the gas dome 60 and in this position is presented with nothing but gas-free liquid. Baffle 86 is supported in the gas dome by rod 90 which is tapped into bottom 78 and which extends through cover 80 for securing the cover against fluid pressure. A flexible O ring 92a is provided to seal cover 80 against body 76. A handwheel 96 is provided to tighten the cover and baffle assembly in place. In this manner, a very simple construction is provided having easy access for cleaning when the machine is shut down and the fluid pressure off. By simply turning handwheel 96 and removing cover 80, the entire assembly may be removed and tank 76 cleaned when necessary. In a very similar manner, handwheel 98 seals filter assembly 54 and may likewise be easily operated for simple replacement of plugged filter cartridges.

In many machining operations, particularly electrical discharge machining, a gas dome such as 60 will be found sufficient to remove gas from the system. In these cases, it may be unnecessary to provide a special gas-eliminating manifold (as shown in FIG. 4), particularly when used with convex electrodes. In most ECM operations and many EDM operations, such a manifold must be provided to achieve optimum machining. In some instances, a gas-eliminating manifold by itself is entirely sufficient to eliminate all entrapped gas both in the circulating system and in the working gap itself.

Referring now to FIG. 4, a typical manifold 18 is shown secured to machine platen 20 through use of T-slots 100, T-bolts 102, and nuts 104. Workpiece 14 is properly positioned on machine bed 12 and secured in place as is common in the art. During machining, fluid under the desired pressure is provided through inlet 106 to manifold 18. A bypass outlet 108 is provided and operates in a manner identical to that of outlet 82 and bypass valve 66 (FIGS. 1 and 3) in which the unwanted portion of the fluid is bypassed. Once again, since this inlet and outlet are provided at the top of the manifold, the entrapped gas flows out of bypass outlet 108 and gas-free coolant is supplied under pressure to the machining gap through passages 110 in the electrode 68. In nearly every instance of electrical machining, use of a fluid manifold of the type just described or its equivalent will provide significant improvement in the machining operation.

A coolant distribution system for a concave electrode is shown in somewhat schematic form in FIG. 5. FIG. 7 shows a modified system wherein the fluid exhaust ports are sealed, as will be described. During normal machining operations, pump 112 supplies liquid under pressure through line 114 to coolant holes 116 drilled in the protuberant machining portions of electrode 70. This system may be provided with a gas dome as shown in FIG.

3, or a manifold somewhat similar to that shown in FIG. 4, but containing special sealing means for exhaust ports as shown in FIG. 7. A special manifold 118 is used, and this sealing means is usually provided when originally machining the manifold. In this method of operation, the forward coolant holes and exhaust coolant holes are laid out in the manifold and identified. A slot or series of slots such as 120 is then milled in the manifold providing chambers connecting all such coolant holes 116 together, frequently milling away all stock except in the immediate area of relief holes 122. In this manner, a series of bosses or protruding areas contact the back face of the electrode and thus seal off exhaust holes 122 from the pressure chamber. These exhaust holes are subsequently vented to atmosphere. The principles of construction of the manifold are still the same, in that the pressure inlet and bypass outlet are provided at the top of the manifold in exactly the same manner as shown in FIG. 4. Through this somewhat more involved system, gas free liquid is provided to the machining gap and any gas trapped in pockets 72 is exhausted through vents 122 to atmosphere.

FIG. 6 is a bottom view of the electrode 70. The electrodes shown in FIGS. 5 and 7 are the same.

Another quite different and advanced form of operation may be practiced in accordance with this invention in the system shown in FIG. 5 by reversing pump 112 in which line 114 becomes a suction line and line 124 becomes a pressure line, the exact opposite of that just described. In my copending application Ser. No. 43,361, filed July 18, 1960, I show a specialized method of electrical discharge machining entitled, "Multiple Discharge Machining." By special means outlined in that application, I maintain a layer of eroded particles in the working gap to act as an electrical or thermal cushion or barrier between the electrode and the workpiece. As outlined in that application, it is sometimes quite difficult to maintain that barrier properly and coolant conditions must be ideal to provide a uniform barrier for a wide variety of machining operations. I have found in such machining operations that the direction of liquid flow is best operated in reverse to that normally provided. In other words, line 114 and associated lines become suction lines for drawing liquid away from the forwardmost portions of the electrode. In instances where this method is practiced, a filter is generally provided in the intake of pump 112 to prevent sludge from being pumped through that unit or a special pump is provided capable of pumping the extremely fine abrasive grit produced in electrical discharge machining. The particles machined from the electrode and workpiece in this method are usually quite large and heavy and will settle readily to the bottom portion of a cavity being machined. Similarly, it is quite difficult with a normal volume of coolant flow to provide a uniform method of forcing these heavy particles upward. I find that by withdrawing liquid from the protruding portions of the electrode adjacent the bottom of the machined cavity, I can maintain a substantially uniform layer of these particles, thereby providing improved machining as outlined in the above application. Furthermore, I find that when coolant is provided with sufficient velocity to carry particles out of the gap in the normal direction, the extremely critical balance is destroyed and results are sometimes poor.

In this method of machining, liquid is drawn from the outer protuberant portions of the electrode and thus fluid must enter the gap through coolant holes 122. In this case, spacers 126 may be used in place of a manifold such as 118, thus providing a free path for coolant from the workpan. When a manifold is not used then individual coolant suction lines or tubing are provided as shown by the individual branches in FIG. 5. Since the electrode is always submerged in liquid, this liquid is gas free. Since coolant holes 122 are now intake holes with coolant flowing in these holes, the size of these coolant holes 116 and 122 is quite critical. Normally, the forwardmost portion of coolant hole 122, shown at 123, is approximately ⅛" or larger. Coolant suction lines 114 are usually ⅛" or smaller and have a substantially longer passageway than that of portion 123. In addition, coolant hole 122 is counterbored to a larger diameter as shown to within approximately ⅛" to ¼" of the machining face of the electrode. By constructing these coolant holes in this relationship, substantially all of the fluid pressure drop occurs in lines 114 and the relative pressure drop and velocity through orifice 123 is therefore much lower. With this specialized construction, gas that is entrapped in concave portion 72 will develop sufficient localized upward pressure to bubble through orifice 123 and up through opening 122 even though that coolant hole normally provides a coolant inlet rather than an outlet. Thus, localized gas bubbles are eliminated from this pocket even though the prevailing coolant flow is exactly opposite that presently employed in the art.

An additional advantage in employing this electrode construction for multiple discharge machining is that with normal coolant flow, the protuberant portions of the electrode tend to wear excessively and the particles of the barrier maintained in the gap tend to adhere to the electrode in the uppermost portion of the pocket or around coolant holes 123. This, of course, occurs with normal coolant flow and is completely eliminated by providing coolant flow in the opposite direction as described above, since this layer of machined particles is flushed away from the uppermost portion and additionally settles by gravity to the deepest portions of the cavity to be withdrawn through lines 114. I have thereby provided gas-free machining even in this extremely specialized method.

In the foregoing examples, I have shown the electrode mounted above the workpiece and coolant holes machined in the electrode. In certain specialized applications, particularly with electrodes that would by this definition be concave, the workpiece is mounted above the electrode and on these occasions coolant holes are then sometimes provided in the workpiece. It may readily been seen that this same method may be employed whether the electrode or workpiece is mounted in the uppermost position, the essential characteristics being described above for either form of operation.

FIG. 8 shows a construction of a special filter assembly which may replace filter 54 in FIG. 1. FIG. 1 shows a standard filter assembly and a gas dome constructed to eliminate entrapped gas in the system. The need for this special dome is eliminated if the filter assembly is especially constructed in accordance with the teachings of my invention. Filter assembly 126 (shown in FIG. 8) comprises a body 128 which is of cylindrical construction and a base 130. An external pipe flange 132 and internal mounting flange 134 are welded to base 130 to provide a fluid outlet from the bottom of the filter. A hole 136 is drilled in mounting flange 134 to provide filtered liquid outlet from the inside of filter element 138.

The filter element assembly itself is composed of end plates 140 and 142 and a pleated paper filter element 144 bonded to the end plates. In this example, I show a filter element known commercially as a "pleated paper filter element"; however, any suitable filter element or bank of elements may be readily substituted. A rod 146, threaded at each end, extends through the center of the filter element for sealing it in place by means of nut 148, retaining ring 150 and gaskets 152 at the top of the element and as the bottom of the element. Rod 146 extends through cover 154 for securing the cover in place by means of handwheel 156.

This construction provides a fluid tight filter casing and a chamber for unfiltered coolant which flows in through inlet 158. The inside of filter element 138 is sealed from this chamber (as shown) and unfiltered coolant entering the inlet 158 at the top of the filter assembly must pass through the pleated paper 144 to the inside of element 138. Filtered gas-free liquid leaves the inside of the filter element through port 136 to outlet 160.

Bypass outlet 162 is provided near the top of the filter case for bypassing the undesired gas and the excess liquid exactly as the gas dome assembly 60 (shown in FIG. 3). If the filter is specially constructed in this manner, gas dome 60 may therefore be eliminated, since the exact function of the dome is now achieved by this special filter construction.

It will thus be seen that I have shown and described a new and improved method for electrical machining and preferred examples of apparatus for carrying on the process.

I claim:

1. In combination with electrical machining apparatus for machining conductive workpieces by passing current across a gap between a machining face of an electrode and a workpiece, means for delivering fluid coolant to the gap under pressure, and means for removing from said coolant any gas trapped therein comprising a pressure dome having a fluid inlet adjacent the top of said dome, a fluid outlet to said gap adjacent the bottom of said dome and a bypass outlet adjacent the top of said dome in spaced relation to said fluid inlet.

2. The combination set forth in claim 1, in which said inlet is located near the top of said dome and said inlet and outlet are separated by at least one baffle plate.

3. The combination set forth in claim 1, in which said means for removing gas from said coolant includes a manifold attached to said electrode, said manifold having a fluid chamber, a fluid inlet and a bypass outlet located near the top of the chamber, said electrode having passages extending from the bottom of said chamber to the machining face of the electrode.

4. Electrical machining apparatus including an electrode having its machining face and a workpiece disposed in proximate spaced relationship, a fluid manifold operatively connected to said electrode, means for supplying fluid under pressure to said manifold, a bypass outlet located substantially at the top of said manifold, passages through the electrode connecting the machining face of the electrode with the manifold and means for controlling fluid discharge from the bypass to provide gas-free fluid through said passages to the machining face to said electrode.

5. The combination set forth in claim 4, in which said electrode machining face includes concave portions, including passages from the top of said concave portions for permitting gas to escape from said portions.

6. An electrical machining electrode assembly which comprises, an electrode having an irregular machining face including protuberant portions, a fluid manifold carried by said electrode and having a chamber therein, passages in said electrode communicating with said chamber and said protuberant face portions, a fluid inlet connected to said chamber, and a bypass outlet in said chamber disposed adjacent the highest portion thereof for venting gas from said manifold.

7. An electrical machining electrode assembly which comprises an electrode having an irregular machining face portion including protuberant portions and adjacent reentrant portions, a first set of passages connecting the faces of said protuberant portions with the opposite face of the electrode, a second set of passages connecting the reentrant portions with the opposite face of the electrode, and a manifold carried by said electrode having pressure fluid passages therein connected with said first set of passages and venting passages therein connected with said second set of passages.

8. In an electrical machining apparatus, an electrode having a machining face including adjacent protuberant and concave portions, a plurality of coolant passages in said electrode connected with said protuberant and concave electrode portions, means for submerging said electrode in coolant during machining, suction means for drawing fluid through the passages connected with said protuberant portions during machining, means for delivering fluid to the passages connected with said concave portions during machining, said suction passages having a higher fluid flow restriction than said delivery passages.

9. The combination set forth in claim 8 in which said intake passages have a larger cross section than said suction passages to provide decreased fluid velocity in the said suction passages for permitting gas to rise through said suction passages from said concave portions of said electrode.

10. In an electrical machining apparatus for machining a conductive workpiece by current flow across a fluid filled gap, an electrode having a machining face including at least one protuberant portion, an inlet passage communicating therethrough, means for withdrawing fluid through said inlet passage, and venting means in said machining face proximate said protuberant portion for removing gas from the fluid in the gap, said venting means comprising at least one concave portion, said concave portion having a vent passage extending through the electrode face opposite said machining face.

11. The combination as set forth in claim 10 in which said inlet passage is substantially smaller in cross section than said vent passage of said concave portion to provide a relatively lower velocity through said last mentioned passage whereby gas is entrapped in said concave portion and vented upwardly through the electrode from the gap.

References Cited

UNITED STATES PATENTS

| | | | |
|---|---|---|---|
| 2,308,860 | 1/1943 | Clark | 219—69 X |
| 2,765,394 | 10/1956 | Griffith | 219—69 |
| 2,885,529 | 5/1959 | Nelson | 219—69 |
| 3,144,540 | 8/1964 | Haas | 219—69 |
| 3,144,541 | 8/1964 | Hill | 219—69 |

RICHARD M. WOOD, *Primary Examiner.*

R. F. STAUBLY, *Assistant Examiner.*